United States Patent
Baba et al.

(10) Patent No.: US 11,156,983 B2
(45) Date of Patent: Oct. 26, 2021

(54) NOISE MONITORING DEVICE

(71) Applicant: FANUC Corporation, Yamanashi (JP)

(72) Inventors: Takahiro Baba, Yamanashi (JP); Hiroshige Ando, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 423 days.

(21) Appl. No.: 16/195,858

(22) Filed: Nov. 20, 2018

(65) Prior Publication Data

US 2019/0155250 A1    May 23, 2019

(30) Foreign Application Priority Data

Nov. 22, 2017   (JP) .............................. JP2017-224367

(51) Int. Cl.
*G05B 19/4068*   (2006.01)
*G05B 19/418*    (2006.01)
*G05B 23/02*     (2006.01)

(52) U.S. Cl.
CPC ..... *G05B 19/4068* (2013.01); *G05B 19/4183* (2013.01); *G05B 23/0272* (2013.01); *G05B 2219/37337* (2013.01)

(58) Field of Classification Search
USPC ....................................................... 702/182
See application file for complete search history.

(56) References Cited

U.S. PATENT DOCUMENTS

| | | | | |
|---|---|---|---|---|
| 4,926,353 | A | * 5/1990 | Groezinger | G07C 3/04 702/182 |
| 2005/0170784 | A1 | * 8/2005 | Ariyoshi | H04B 5/00 455/67.13 |
| 2008/0244329 | A1 | 10/2008 | Shinbo et al. | |
| 2012/0078670 | A1 | * 3/2012 | Yamamura | G05B 19/4184 705/7.11 |
| 2015/0220847 | A1 | 8/2015 | Shibuya et al. | |
| 2015/0338843 | A1 | 11/2015 | Okita | |

FOREIGN PATENT DOCUMENTS

| | | |
|---|---|---|
| JP | 2003162325 A | 6/2003 |
| JP | 2003308107 A | 10/2003 |
| JP | 2008250594 A | 10/2008 |
| JP | 2008262359 A | 10/2008 |
| JP | 2009217457 A | 9/2009 |
| JP | 2015148867 A | 8/2015 |
| JP | 2015-225392 A | 12/2015 |
| JP | 2017117034 A | 6/2017 |

* cited by examiner

*Primary Examiner* — Paul D Lee
(74) *Attorney, Agent, or Firm* — Hauptman Ham, LLP

(57) ABSTRACT

A noise monitoring device capable of easily estimating a noise generation source in a factory is connected for communication with a plurality of machines in the factory. The noise monitoring device is provided with a noise information acquisition unit configured to acquire noise information including the time of generation of noise if the noise is generated in the machines, an operation information acquisition unit configured to continually acquire operation information of all the machines, a determination unit configured to extract the operation information at a point in time near the noise generation time, and a display unit configured to display the noise information and the operation information of all the machines at the point in time near the noise generation time.

6 Claims, 9 Drawing Sheets

FIG. 3

| OPERATION CONTENTS | PRIORITY | MAINTENANCE INFORMATION |
|---|---|---|
| M03 S10000 | 3 | CONFIRM NOISE GENERATION POINT ON NOISE COUNTER SCREEN ON NOISE DETECTION SIDE. CABLE CLAMPED ON NOISE DETECTION SIDE? |
| M03 S5000 | 2 | CONFIRM NOISE GENERATION POINT ON NOISE COUNTER SCREEN ON NOISE DETECTION SIDE. CABLE CLAMPED ON NOISE DETECTION SIDE? |
| M03 S1000 | 1 | CONFIRM NOISE GENERATION POINT ON NOISE COUNTER SCREEN ON NOISE DETECTION SIDE. CABLE CLAMPED ON NOISE DETECTION SIDE? |
| MEMORY Y100.0 0→1 | 3 | CONFIRM GROUNDING OF I/O AND I/O CABLE CLAMP ON NOISE CAUSE SIDE |
| MEMORY Y200 1→0 | 2 | CONFIRM GROUNDING OF I/O AND I/O CABLE CLAMP ON NOISE CAUSE SIDE |
| G00 PARAMETER 1020 30000 | 2 | CONFIRM NOISE GENERATION POINT ON NOISE COUNTER SCREEN ON NOISE DETECTION SIDE. CABLE CLAMPED ON NOISE DETECTION SIDE? |
| ⋮ | ⋮ | ⋮ |

131

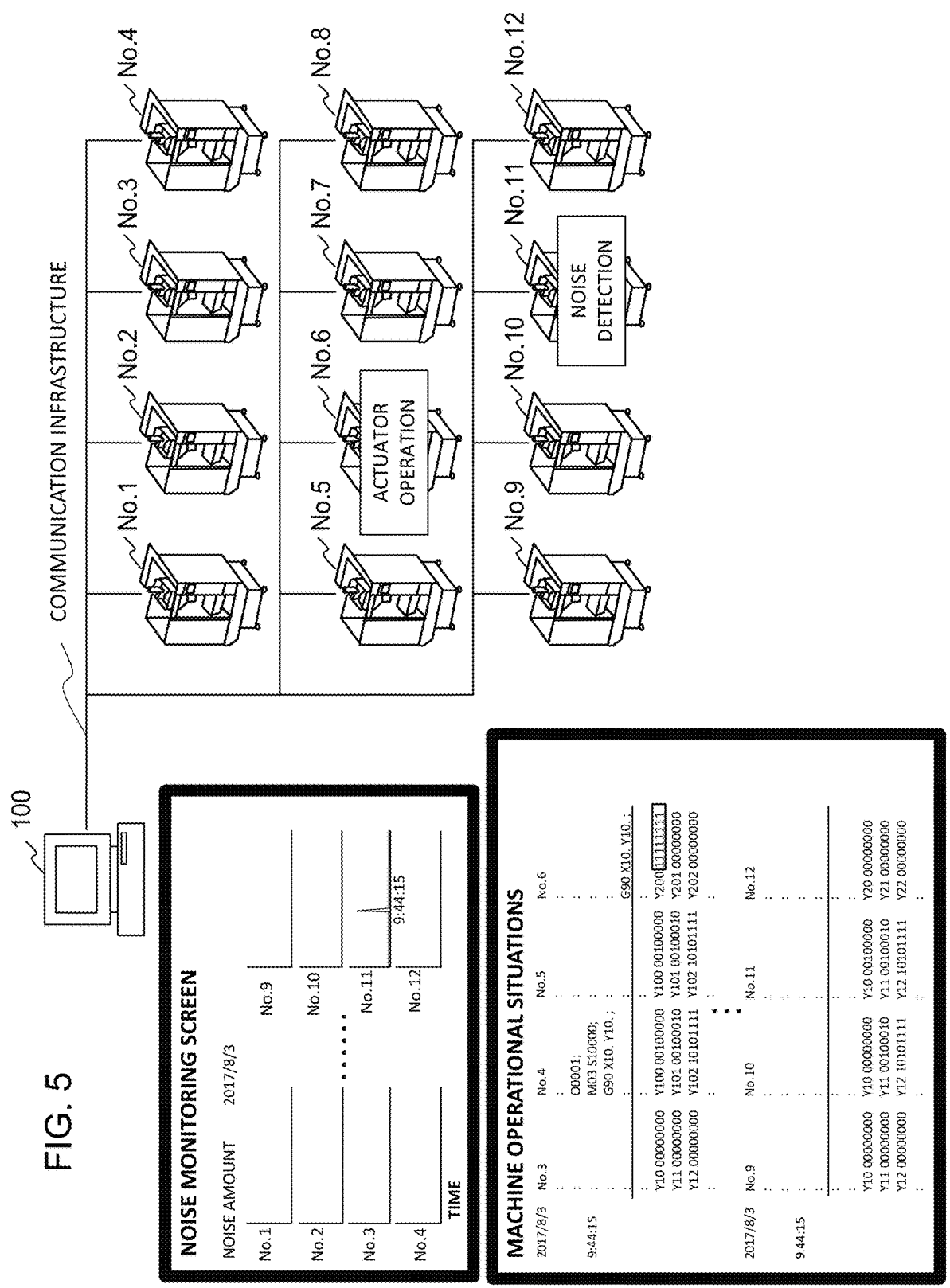

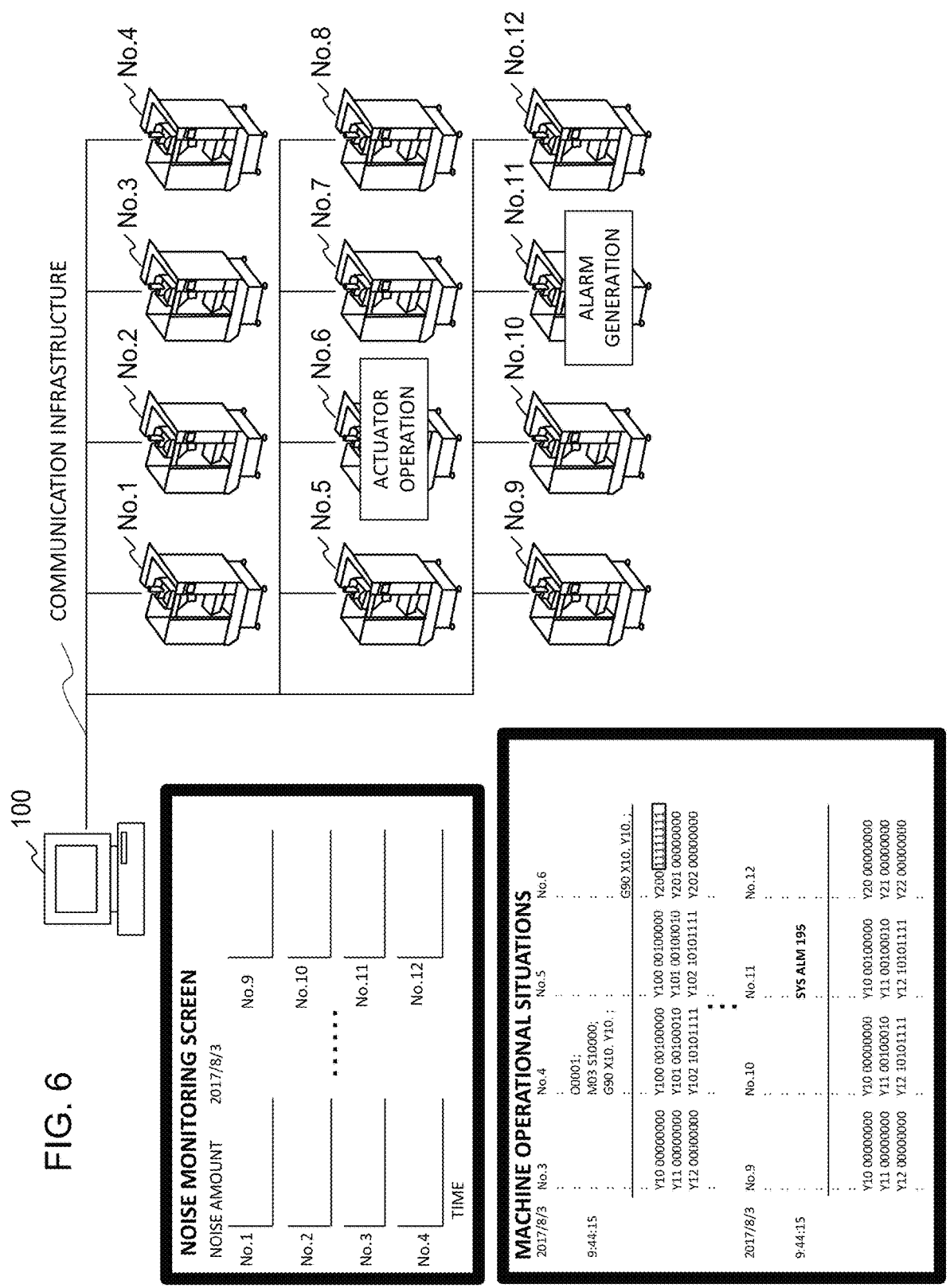

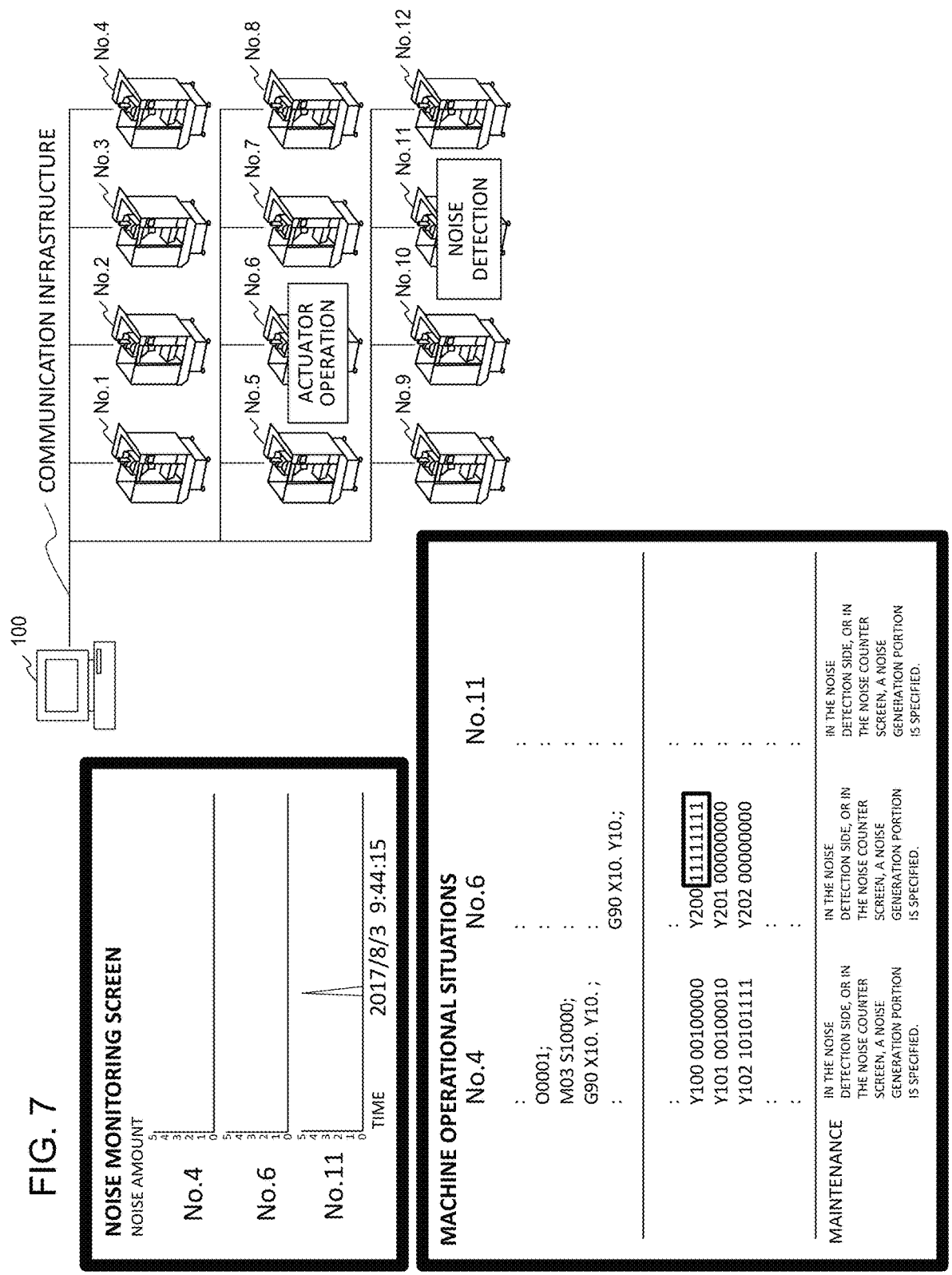

NOISE MONITORING DEVICE

RELATED APPLICATIONS

The present application claims priority of Japanese Application Number 2017-224367, filed on Nov. 22, 2017, the disclosure of which is hereby incorporated by reference herein in its entirety.

BACKGROUND OF THE INVENTION

Field of the Invention

The present invention relates to a noise monitoring device, and more particularly, to a noise monitoring device capable of easily estimating a noise generation source in a factory.

Description of the Related Art

Various techniques have been proposed to detect noise generated in factories. For example, a CNC (computerized numerical control) is based on a known technique for identifying a communication path to which noise is applied. Moreover, some conventional communication techniques (FL-NET, Ethernet®, etc.) have a noise counter function.

Also known is a function (machine state monitoring function) capable of saving various pieces of CNC information if an abnormal state is generated by noise or the like in a machine. Recently, there has also been proposed a function capable of centralized management of the operational situations of a plurality of machines in a factory, based on an IoT technology.

Japanese Patent Application Laid-Open No. 2015-225392 discloses a technique for displaying blocks of a machining program and noise detection data side by side.

According to the prior art, it is somewhat possible for the machine to ascertain noise generated within itself and for the CNC to ascertain noise generated within devices under its management. In this case, measures can easily be taken to counter noise. In not a few cases, however, operations of some machines may cause abnormality in other machines, and it is difficult to identify the cause of the abnormality in such cases. Specifically, if noise is generated due to the surrounding environment in the factory, it is very difficult to identify the cause of the abnormality. Since the noise generation is intermittent and hard to duplicate, in particular, the difficulty of the identification is increased.

SUMMARY OF THE INVENTION

The present invention has been made to solve the above problems and has an object to provide a noise monitoring device capable of easily estimating a noise generation source in a factory.

A noise monitoring device according to one embodiment of the present invention is a noise monitoring device connected for communication with a plurality of machines in a factory and comprises a noise information acquisition unit configured to acquire noise information including the time of generation of noise if the noise is generated in the machines, an operation information acquisition unit configured to continually acquire operation information of all the machines, a determination unit configured to extract the operation information at a point in time near the noise generation time, and a display unit configured to display the noise information and the operation information of all the machines at the point in time near the noise generation time.

In the noise monitoring device according to the one embodiment of the invention, the display unit displays a time-series change of the noise information and displays operation contents of the machines as the operation information.

In the noise monitoring device according to the one embodiment of the invention, the display unit highlights those pieces of the operation information which are changed at the point in time near the noise generation time.

In the noise monitoring device according to the one embodiment of the invention, the determination unit extracts, from the operation information of all the machines, only the operation information obtained at the point in time near the noise generation time and having a high probability of being a cause of the noise generation, and the display unit displays the noise information and the operation information of only those machines with a high probability of being a cause of the noise generation obtained at the point in time near the noise generation time.

In the noise monitoring device according to the one embodiment of the invention, the determination unit holds a data base in which a priority is defined according to the contents of the operation information and extracts the operation information with the high probability of being a cause of the noise generation with reference to the data base.

In the noise monitoring device according to the one embodiment of the invention, the determination unit holds a data base in which maintenance information is defined according to the contents of the operation information, and the display unit displays the maintenance information in addition to the noise information and the operation information.

According to the present invention, there can be provided a noise monitoring device capable of easily estimating a noise generation source in a factory.

BRIEF DESCRIPTION OF THE DRAWINGS

The above and other objects and features of the present invention will be obvious from the ensuing description of embodiments with reference to the accompanying drawings, in which:

FIG. 3 is diagram showing an example of a data base;

FIG. 5 is a diagram showing an operation example of the noise monitoring device;

FIG. 6 is a diagram showing an operation example of the noise monitoring device;

FIG. 7 is a diagram showing an operation example of the noise monitoring device.

DETAILED DESCRIPTION OF THE PREFERRED EMBODIMENTS

Figure 1:
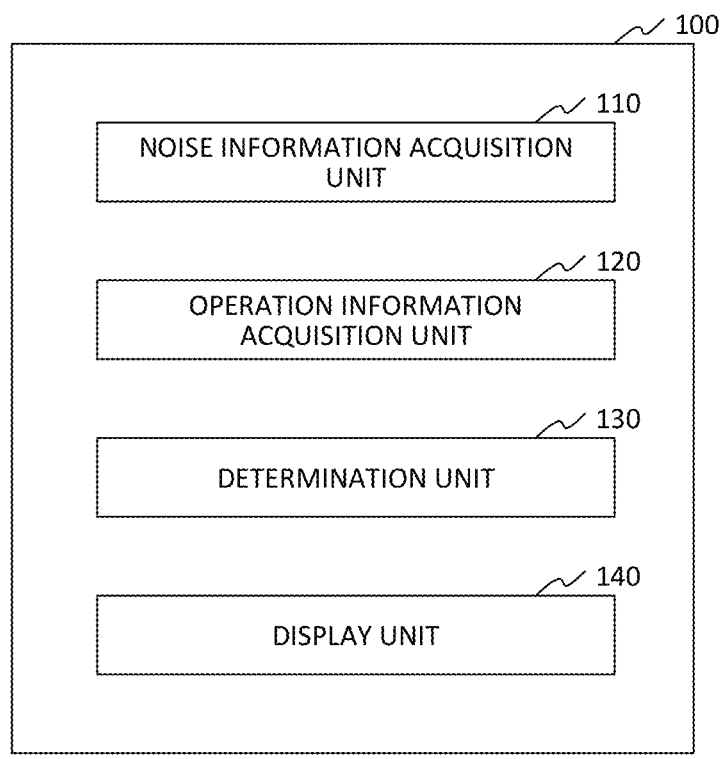
FIG. 1 is a block diagram showing the functional configuration of a noise monitoring device.

A noise monitoring device 100 according to an embodiment of the present invention will be described with reference to the accompanying drawings. FIG. 1 is a block diagram showing the functional configuration of the noise monitoring device 100. The noise monitoring device 100 comprises a noise information acquisition unit 110, operation information acquisition unit 120, determination unit 130, and display unit 140. The noise monitoring device 100 is an information processor comprising a central processing unit (CPU), storage device, input/output device, and the like, and is typically a personal computer (PC). The noise monitoring device 100 logically implements the processing units as the CPU executes programs stored in the storage device.

Figure 2:
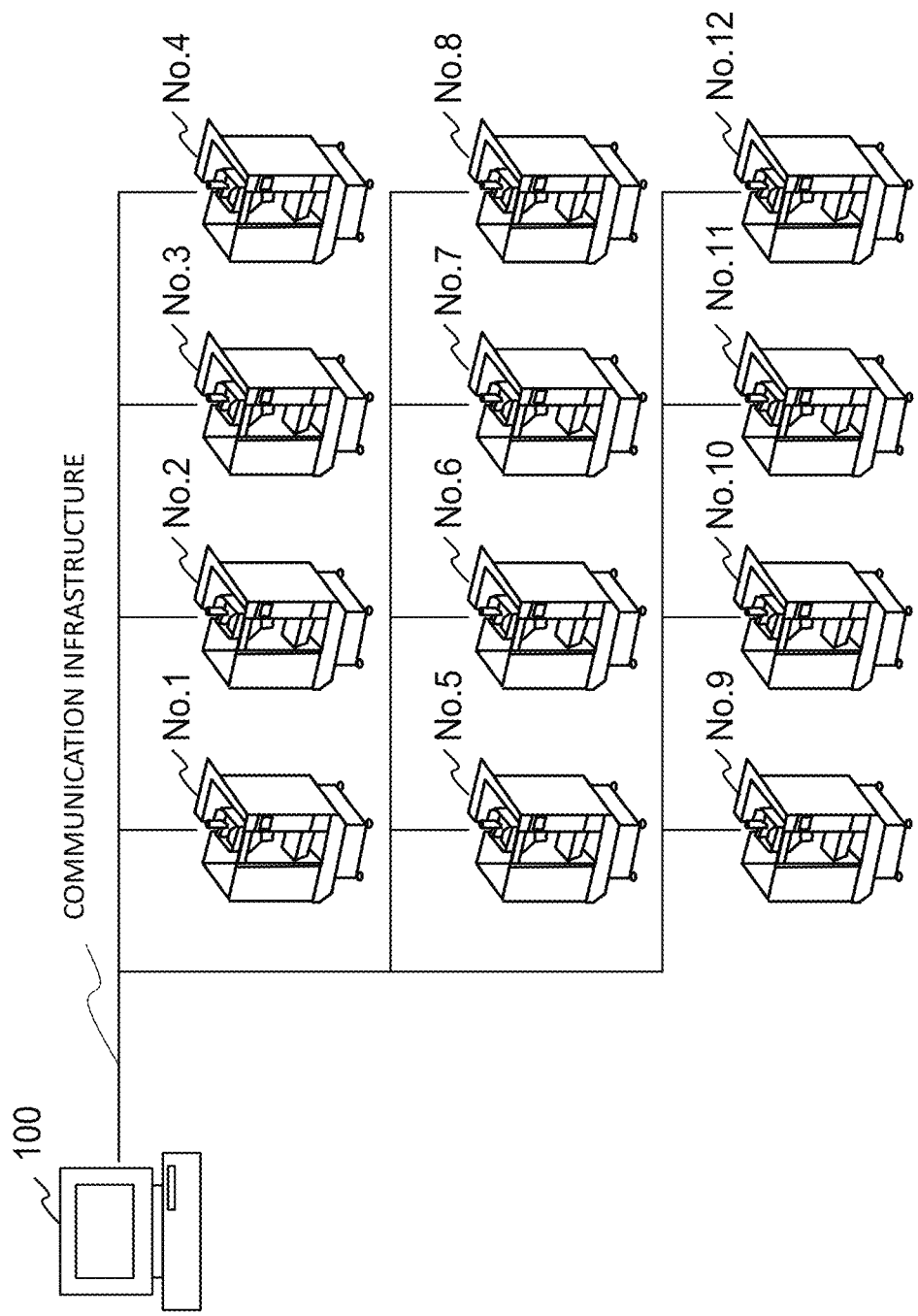
FIG. 2 is a block diagram showing the configuration of a system including the noise monitoring device.

The noise information acquisition unit 110 monitors the noise generation situations of each of machines (devices including a numerical controller (CNC), peripheral device, and machine tool capable of detecting noise generation) in a factory. As shown in FIG. 2, the machines are connected to the noise monitoring device 100 through the communication infrastructure and notify the noise information acquisition unit 110 of the detection of the noise generation using the communication function of the communication infrastructure. On receiving this notification, the noise information acquisition unit 110 saves identification information on the machines in which the noise generation is detected and noise information including the noise generation time, noise level, and the like. The noise information acquisition unit 110 may be configured to save the noise information only if the noise level exceeds a predetermined threshold.

The operation information acquisition unit 120 monitors the operational situations of each machine in the factory. Specifically, each machine periodically sends operation information indicative of its own operational situations and those of devices under its management to the operation information acquisition unit 120. The operation information can include, for example, identification information on the machines, time, and operation contents of the machines at the time concerned. The operation contents include, for example, the spindle acceleration and actuator operation. The operation information acquisition unit 120 saves the received operation information.

When new noise is generated (i.e., when the noise information is saved by the noise information acquisition unit 110), the determination unit 130 extracts the operation information at substantially the same time as the noise generation saved by the operation information acquisition unit 120. This noise information and the extracted operation information are output to the display unit 140. The extracted operation information may be related to all the machines. Alternatively, it may be related to some of the machines selected according to a predetermined criterion.

For example, the determination unit 130 may be provided with a data base 131 such as that shown in FIG. 3. In the data base 131, the priority, maintenance information, and the like are associated with the operation contents of the machines. For example, priorities 3, 2 and 1 are assigned to operation contents "M03 S10000", "M03 S5000", and "M03 S1000" (spindle speeds of 10000, 5000, and 1000), respectively. Pieces of information such as "CONFIRM NOISE GENERATION POINT" and "CABLE CLAMPED?" are individually recorded as the maintenance information. Likewise, the priority and maintenance information are also saved in association with operation contents such as "MEMORY Y100.0 0→1" and "MEMORY Y200 1→0" (commands are output to external equipment by the CNC, e.g., the actuator operation is commanded) and "G00 PARAMETER 1020=30000" (fast-forwarding at speed of 3000).

The priority can be set in advance according to the probability of being a cause of noise generation. In consideration of a user's experience, for example, a higher (or lower) priority can be given to an operation with a higher probability of being a cause of noise generation. Moreover, the maintenance information can contain measures that can be taken if noise is generated due to the operation. For example, confirmation items and operation contents for noise suppression can be listed in the maintenance information.

The determination unit 130 can retrieve the data base 131 with the operation contents in the operation information of all the machines at substantially the same time as the noise generation used as keys and acquire priorities associated with the operation contents. Also, the determination unit 130 can identify the operation contents with the priority exceeding or not exceeding a predetermined threshold (e.g., priority exceeding or not exceeding 2) and extract only the operation information including these operation contents.

Figure 4A:
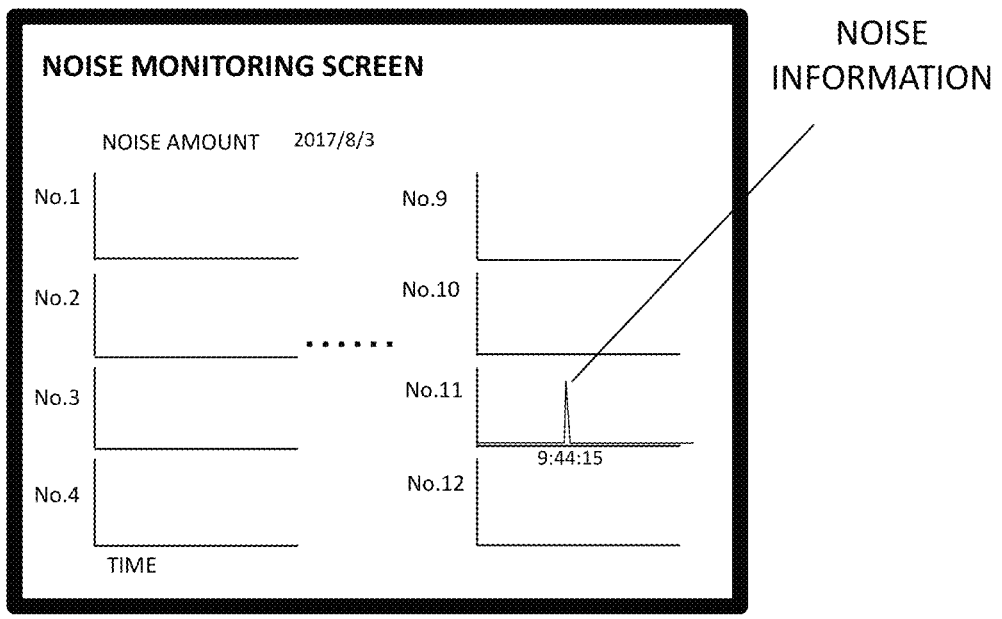
FIG. 4A is a diagram showing a display example of a display unit.
Figure 4B:
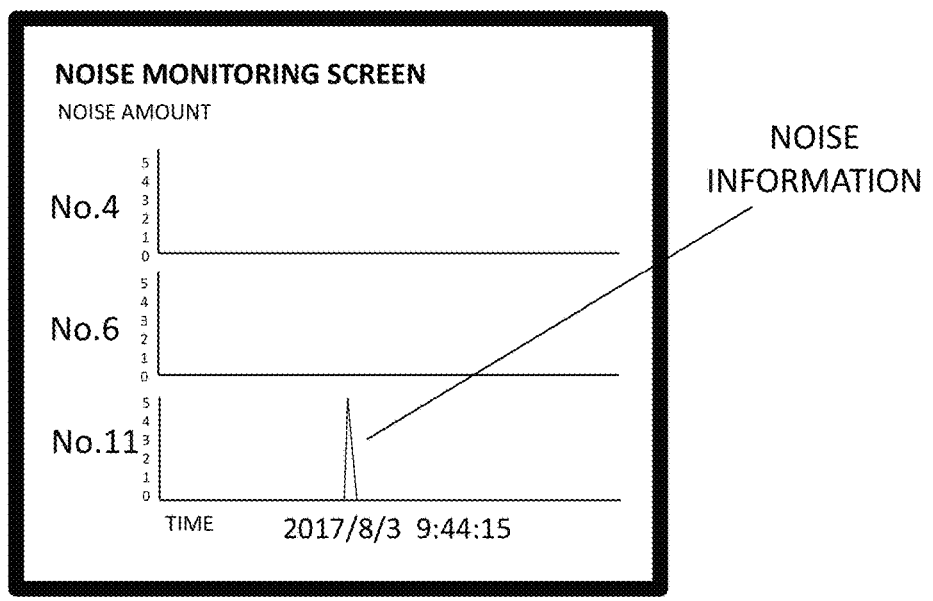
FIG. 4B is a diagram showing a display example of the display unit.

The display unit 140 displays the noise information and the operation information received from the determination unit 130 on its display device. FIGS. 4A and 4B show examples of the noise information and the operation information displayed by the display unit 140. FIG. 4A shows a display example in which the noise information and the operation information of all the machines at substantially the same time are displayed simultaneously. FIG. 4B shows a display example in which the noise information and the operation information of some machines (machines having been performing an operation with a high probability of being a cause of noise generation) at substantially the same time are displayed simultaneously.

Example 1

The operation of the noise monitoring device 100 in the case where the operation information of all the machines is displayed in case of noise generation will be described with reference to FIG. 5.

The noise monitoring device 100 is connected with 12 machines No. 1 to No. 12. Let us assume that generation of noise exceeding a predetermined threshold is detected in the machine No. 11 at time 9:44:15. The noise information acquisition unit 110 receives notification of the noise generation from the machine No. 11 and generates and saves the noise information.

The operation information acquisition unit 120 continually periodically collects and accumulates the operation information from all the machines in the factory. When new noise information is saved in the noise monitoring device 100, the determination unit 130 extracts those of pieces of operation information collected at a point in time near the time of noise generation out of the accumulated pieces of operation information. For example, the determination unit 130 can extract and output one piece of operation information at a time closest to the noise generation time, out of the operation information obtained before the noise generation time, for each of the machines. Alternatively, for example, a plurality of pieces of operation information acquired during a time period of a predetermined length (e.g., 3 seconds) immediately before the noise generation time are extracted for each machine. Then, it is checked whether or not the operation contents are changed within that time period. If the operation contents are changed, operation information after the change is output. If not, any piece of operation information is output.

The display unit 140 simultaneously displays the noise information newly saved by the noise information acquisition unit 110 and the operation information output from the determination unit 130. As shown in FIG. 5, for example, it is possible to display noise information graphically displayed so that time-series changes of the noise level can be deciphered and codes indicative of the operation contents of all the machines at a point in time near the time concerned. As this is done, highlighting can be used for those machines whose operation contents are changed immediately before the noise generation time, that is, the display forms of those machines can be differentiated from those of other machines. In this way, the machines having a high possibility of being a cause of noise generation can be emphasized.

Example 2

The operation of the noise monitoring device 100 in the case where the operation information of all the machines is displayed when an alarm suspected to be caused by noise is generated in the machines will be described with reference to FIG. 6. In Example 1, the operation information of all the machines is displayed in case of actual noise generation. In Example 2, on the other hand, the same processing as in the case of noise generation is performed if the alarm liable to be generated by noise is generated in the machines although the noise generation is not detected by the noise information acquisition unit 110.

The noise monitoring device 100 is connected with 12 machines No. 1 to No. 12. Let us assume that an alarm is generated in the machine No. 11 at time 9:44:15. The noise information acquisition unit 110 receives notification of the alarm generation from the machine No. 11 and saves alarm information. The alarm information includes, for example, identification information on the machines in which the alarm generation is detected and the generation time and content of the alarm.

The operation information acquisition unit 120 continually periodically collects and accumulates the operation information from all the machines in the factory. When new alarm information is saved in the noise monitoring device 100, the determination unit 130 extracts those pieces of operation information collected at a point in time near the time of alarm generation, as in Example 1.

The display unit 140 displays the operation information output from the determination unit 130. As shown in FIG. 6, for example, it is possible to display the machines in which the alarm is generated and their contents and codes indicative of the operation contents of all the machines at a point in time near the time concerned. As in Example 1, the display forms of those machines whose operation contents are changed immediately before the alarm generation time can be differentiated from those of other machines.

Example 3

The operation of the noise monitoring device 100 in the case where only the operation information of those machines with a high probability of being a cause of noise generation is displayed in case of noise generation will be described with reference to FIG. 7.

The noise monitoring device 100 is connected with 12 machines No. 1 to No. 12. Let us assume that generation of noise exceeding a predetermined threshold is detected in the machine No. 11 at time 9:44:15. The noise information acquisition unit 110 receives notification of the noise generation from the machine No. 11 and generates and saves the noise information.

The operation information acquisition unit 120 continually periodically collects and accumulates the operation information from all the machines in the factory. Moreover, the determination unit 130 is assumed to have saved the data base 131 shown in FIG. 3 in advance. It is assumed that higher priorities have greater numbers in the data base 131 and the determination unit 130 is preset so as to extract the operation information including operation contents with the priority exceeding 2. When new noise information is saved in the noise monitoring device 100, the determination unit 130 lists up those pieces of operation information collected at a point in time near the noise generation time, out of the accumulated pieces of operation information, in the descending order of priority. If aging of the operation contents in the data base 131 is defined, the determination unit 130 is expected to first acquire a plurality of pieces of operation information acquired during a time period of a predetermined length (e.g., 3 seconds) immediately before the noise generation and check the acquired operation information for change. For example, "MEMORY Y100.0 0→1" described in the data base 131 indicates that the content of "MEMORY Y100.0" "changes from 0 to 1". Therefore, the determination unit 130 acquires a plurality of contents of "MEMORY Y100.0" of each machine immediately before the noise generation time and confirms the change. The operation information of the machines with the contents "changed from 0 to 1" is extracted and output after the change. In this practical example, the operation information of the machines Nos. 4 and 6 that meet conditions set in the data base 131 is extracted and output.

The display unit 140 simultaneously displays the noise information newly saved by the noise information acquisition unit 110 and the operation information output from the determination unit 130. As shown in FIG. 7, for example, it is possible to display noise information graphically displayed so that the noise level can be deciphered and codes indicative of the operation contents at a point in time near the time concerned, for the machine (No. 11) in which the noise generation is detected and the machines (Nos. 4 and 6) with the high probability of being a cause of noise generation.

Preferably, in this case, the display unit 140 should display the maintenance information together if it is defined in the data base 131. In this practical example, the maintenance information of the machines Nos. 4, 6 and 11 is displayed side by side with the operation information. In this way, measures to counter noise can be effectively taken.

Example 4

Figure 8:
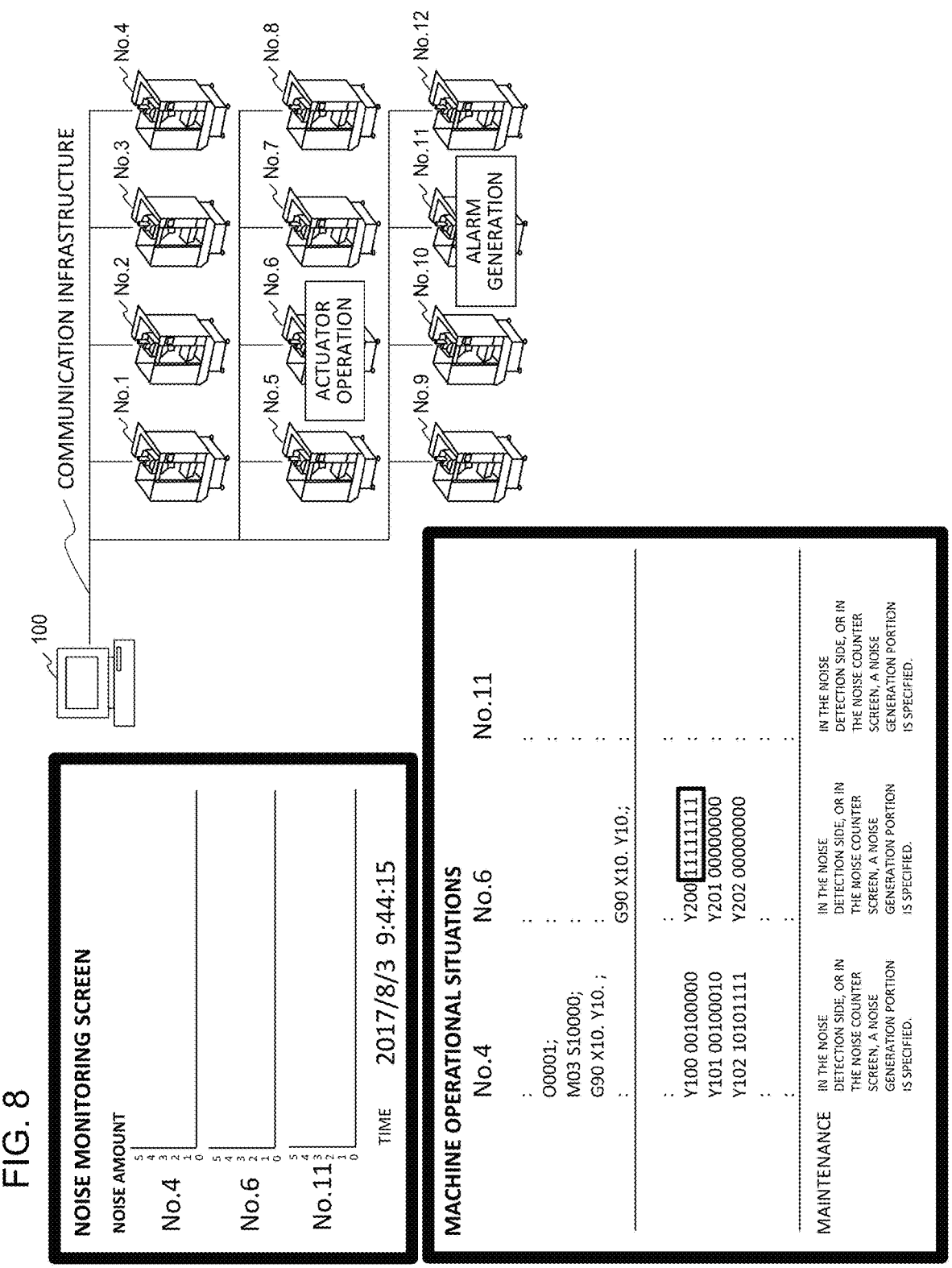
FIG. 8 is a diagram showing an operation example of the noise monitoring device.

The operation of the noise monitoring device 100 in the case where only the operation information of those machines with a high probability of being a cause of noise generation is displayed when an alarm suspected to be caused by noise is generated in the machines will be described with reference to FIG. 8. In Example 3, only the operation information of those machines with a high probability of being a cause of noise generation is displayed in case of actual noise generation. In Example 4, on the other hand, the same processing as in the case of noise generation is performed if the alarm liable to be generated by noise is generated in the machines although the noise generation is not detected by the noise information acquisition unit 110.

The noise monitoring device 100 is connected with 12 machines No. 1 to No. 12. Let us assume that an alarm is generated in the machine No. 11 at time 9:44:15. The noise information acquisition unit 110 receives notification of the alarm generation from the machine No. 11 and saves alarm information.

The operation information acquisition unit 120 continually periodically collects and accumulates the operation information from all the machines in the factory. Moreover, the determination unit 130 is assumed to have saved the data base 131 shown in FIG. 3 in advance, as in Example 3. When new noise information is saved in the noise monitoring device 100, the determination unit 130 lists up those pieces of operation information collected at a point in time near the noise generation time, out of the accumulated pieces of operation information, in the descending order of priority.

The display unit 140 displays the operation information output from the determination unit 130. As shown in FIG. 8, for example, it is possible to display the machines in which the alarm is generated and their contents and codes indicative of the operation contents of all the machines at a point in time near the time concerned. In this case, the display unit 140 can display the maintenance information together if it is defined in the data base 131.

According to the present embodiment, the noise monitoring device 100 can display the operational situations of all the machines connected to the noise monitoring device 100 as well as the machines in which noise is detected when it is generated. In this way, the cause of noise generation can be easily pursued in the case where abnormality occurs in other machines due to noise generated in some machines.

Moreover, the noise monitoring device 100 can extract only those machines with a high probability of being a cause of noise generation and display the operational situations of those machines when the noise is generated. In this way, the cause of noise generation can be pursued more effectively.

Furthermore, the noise monitoring device 100 can display the maintenance information together with the operational situations of the machines when the noise is generated. In this way, the cause of noise generation can be investigated and dealt with by effectively using accumulated knowhow.

While an embodiment of the present invention has been described above, the invention is not limited to the above-described embodiment or examples and may be suitably modified and embodied in various forms.

The invention claimed is:

1. A noise monitoring device independent from and connected for communication with each of a plurality of machines configured to detect noise generation in a factory, the noise monitoring device comprising:
   a processor configured to
      acquire noise information including the time of generation of noise in response to a generation of the noise in the plurality of machines configured to detect noise generation,
      continually acquire operation information of all of the plurality of machines configured to detect noise generation, and
      extract the operation information of the plurality of machines configured to detect noise generation at a point in time near the noise generation time; and
   a display connected to the processor and configured to display the noise information and the operation information of all of the plurality of machines configured to detect noise generation at the point in time near the noise generation time,
   wherein the noise monitoring device is a device independent from the plurality of machines configured to detect noise generation.

2. The noise monitoring device according to claim 1, wherein the display is further configured to
   display a time-series change of the noise information, and
   display operation contents of the plurality of machines configured to detect noise generation as the operation information.

3. The noise monitoring device according to claim 1, wherein the display is further configured to highlight those pieces of the operation information which are changed at the point in time near the noise generation time.

4. The noise monitoring device according to claim 1, wherein
   the processor is further configured to extract, from the operation information of all the plurality of machines configured to detect noise generation, only the operation information obtained at the point in time near the noise generation time and having a high probability of being a cause of the noise generation, and
   the display is further configured to display the noise information and the operation information of only those machines among the plurality of machines configured to detect noise generation with a high probability of being a cause of the noise generation obtained at the point in time near the noise generation time.

5. The noise monitoring device according to claim 4, wherein
   the processor is further configured to
      hold a data base in which a priority is defined according to the contents of the operation information, and
      extract the operation information with the high probability of being a cause of the noise generation with reference to the data base.

6. The noise monitoring device according to claim 1, wherein
   the processor is further configured to hold a data base in which maintenance information is defined according to the contents of the operation information, and
   the display is further configured to display the maintenance information in addition to the noise information and the operation information.

* * * * *